Patented Oct. 6, 1925.

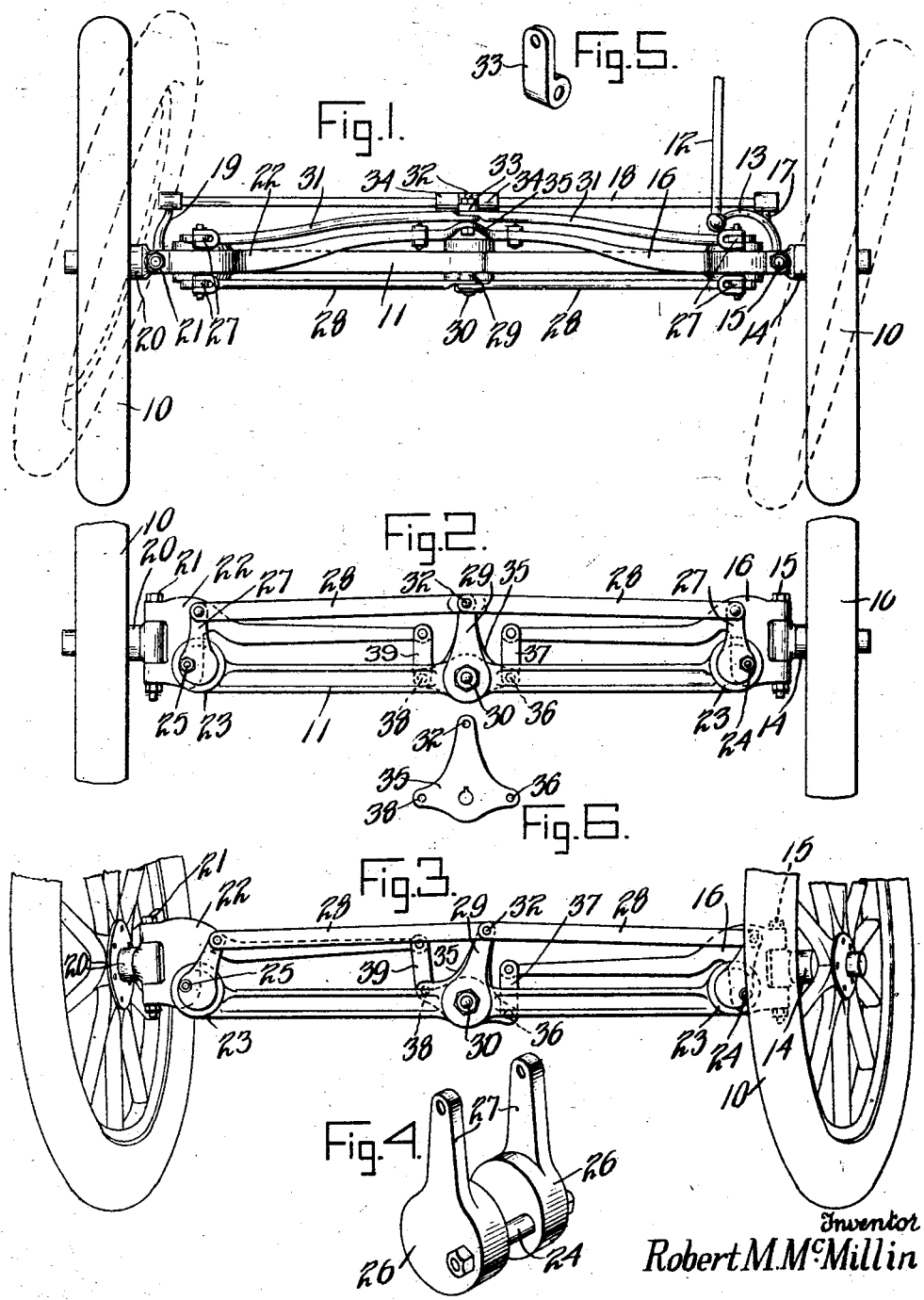

1,556,531

UNITED STATES PATENT OFFICE.

ROBERT M. McMILLIN, OF LAGRANGE, GEORGIA.

VEHICLE STEERING MECHANISM.

Application filed December 27, 1924. Serial No. 758,450.

*To all whom it may concern:*

Be it known that I, ROBERT M. McMILLIN, a citizen of the United States, residing at Lagrange, in the county of Troup and State of Georgia, have invented certain new and useful Improvements in Vehicle Steering Mechanism, of which the following is a specification.

My said invention relates to vehicle steering mechanism and it is an object thereof to provide mechanism of this character in which the front wheels of a vehicle shall be tilted in the direction in which the car is turning so as to throw the center of gravity of the vehicle nearer to the inside of the curve. In a vehicle provided with the device of my invention the wear on the front tires is reduced, the possibility of throwing the tires off the wheel in turning a curve is gradually diminished, there is less tendency to dish the wheel and it is possible to turn corners with greater speed.

A further object of the invention is to provide a device in which the front axle shall be kept horizontal regardless of the inclination of the wheels so that the body of the car will have a minimum torsional strain imposed thereon in turning curves.

Referring to the accompanying drawings which are made a part hereof and on which similar reference characters indicate similar parts, Figure 1 is a plan of the device of my invention, Figure 2, a front elevation in the normal position of parts, Figure 3, a front elevation of the parts in making a right-hand turn, Figure 4, a detail of parts shown in Figures 1 to 3, Figure 5, a detail of a pivot block shown in Figure 1, and Figure 6, a detail of a rocker shown in Figures 1 to 3.

In the drawings reference character 10 indicates the wheels of an automobile or other vehicle having a front axle 11. A rod 12 connected to the steering post is attached at its lower end by a ball and socket joint to an arm 13 rigidly secured to the steering knuckle 14 of one of the wheels which steering knuckle is pivotally connected by a bolt 15 to a supporting lever 16. A rockarm 17 on the same steering knuckle is connected by a rod 18 to a rockarm 19 on the steering knuckle 20 of the other front wheel which is pivotally connected by a bolt 21 to another supporting lever 22.

The front axle 11 is forked at each end and each fork is provided with a circular opening at 23 surrounded by an annular ridge, the forks being spaced sufficiently to receive between them the supporting levers 16 and 22 which are journaled on bolts or shafts 24 and 25 each of said bolts or shafts rigidly connecting a pair of eccentrics 26. One of each pair of eccentrics is journaled in a front fork of the axle and the other in the corresponding rear fork in an opening 23.

The eccentrics 26 have rock-arms 27 extending upwardly therefrom and these arms are connected by links 28 to a rockarm 29 loosely pivoted on a bolt or shaft 30 extending through the axle 11. The rear eccentric of each pair is connected by its rockarm 27 through a link 31 to a bolt 32 extending through eyes in each of the rods 31, through an eye in a pivot piece 33 (Fig. 5) loosely mounted on rod 18 between a pair of collars 34 and through a rocker 35 pivoted on bolt 30. The rocker 35 is pivotally connected at 36 to a link 37 pivotally connected at its other end to the supporting lever 16. The rocker is also pivotally connected at 38 to a link 39 pivotally connected at its other end to the supporting lever 22.

In the operation of my device the front wheels will assume, for example, the position indicated in dotted lines in Figure 1 in making a front turn. To produce this change of direction the steering post is actuated to draw the rod 18 to the right. Through the bolt 32 connected to said rod the links 31 are also drawn to the right and because of the connections from these links through the rock arms 27, eccentrics 26 and bolts 24 and 32, the links 28 at the front of the axle are drawn to the right the loose rockarm 29 swinging with rocker 35.

The lever 22 is elevated at its inner end as indicated in Figure 3 while the lever 16 is depressed at its inner end and this tilts both the wheels in the same direction by reason of the normally vertical pivotal connections through bolts 21 and 15. The result of this tilting action would be to lift the axle at the left end and elevate it at the right end but for the operation of the eccentrics which turn as indicated in Figure 3 as the axles are tilted to incline the wheels, the eccentrics at the left end tilting in a manner to throw the end of the axle downward while those at the right end tilt in a manner to throw the axle upward. In this manner the horizontal position of the axle is maintained although the part of the lever 22 in which the eccentrics are journaled is elevated while the corresponding part of lever 16 is depressed.

It will be obvious to those skilled in the art that various changes may be made in my device without departing from the spirit of the invention and therefore I do not limit myself to what is shown in the drawing and described in the specification but only as indicated in the appended claims.

Having thus fully described my said invention, what I claim as new and desire to secure by Letters Patent is:

1. In a vehicle, an axle having a bearing adjacent each end thereof, eccentrics journaled in said bearings, levers fulcrumed on said eccentrics, steering knuckles carried by said levers, vehicle wheels on said steering knuckles, rock-arms extending rearwardly from the steering knuckles, a rod connecting said rockarms, means for turning the steering knuckles about vertical axes to steer the vehicle, connections from said rod to said levers for tilting them in opposite directions to tilt the vehicle wheels, and connections from said rod to said eccentrics for simultaneously moving them to maintain the horizontal level of the axle, substantially as set forth.

2. In a vehicle, an axle having a bearing adjacent each end thereof, eccentrics journaled in said bearings, levers fulcrumed on said eccentrics, steering knuckles carried by said levers, vehicle wheels on said steering knuckles, rockarms on said steering knuckles, a rod connecting said rockarms, connections from said steering knuckles to a steering post, a bolt swivelly mounted on said rod, links connecting said bolt to said eccentrics, a rockarm also connected to said bolt, and connections from said rockarm to the first-named levers for tilting the wheels simultaneously with the steering operation, substantially as set forth.

3. In a vehicle, an axle having forks at each end, registering bearings in the forks of each pair, a pair of eccentrics journaled in each pair of bearings, a bolt rigidly connecting each pair of eccentrics, a vehicle wheel at each end of the axle each wheel being supported by a pair of eccentrics, means for turning the wheels to steer the vehicle, means for simultaneously tilting the wheels, and means for simultaneously rotating all of said eccentrics to maintain the level of the axle, substantially as set forth.

4. In a vehicle, an axle having forks at each end, registering bearings in the forks of each pair, a pair of eccentrics journaled in each pair of bearings, a bolt rigidly connecting each pair of eccentrics, a vehicle wheel at each end of the axle said wheel being supported by the pair of eccentrics, means for turning the wheels to steer the vehicle, means for simultaneously tilting the wheels, means for simultaneously rotating all of said eccentrics to maintain the level of the axle including a pivot midway between the ends of the axle, a pair of rockarms on the pivot, connections from each rockarm to one of each pair of eccentrics, and connections from the rockarms to the steering gear for moving them in unison, substantially as set forth.

5. In a vehicle, an axle having forks at each end, registering bearings in the forks of each pair, a pair of eccentrics journaled in each pair of bearings, a bolt rigidly connecting the eccentrics of each pair, a lever pivoted on said bolt, a vehicle wheel on each lever, means for turning the wheels about vertical axes to steer the vehicle, means for simultaneously tilting the vehicle wheels including a pivot at the middle of the axle, a rockarm journaled thereon, an extension at each side of the rockarm and links connecting the same extensions to the respective wheel supporting levers, and means for simultaneously rocking the eccentrics to maintain the level of the axle comprising a rockarm loosely mounted on said pivot, links connecting said rockarm to a pair of said eccentrics, and links connecting the other pair of eccentrics to the first-named rockarm, substantially as set forth.

6. In a vehicle, an axle having forks at each end, registering bearings in the forks of each pair, a pair of eccentrics journaled in each pair of bearings, a bolt rigidly connecting the eccentrics of each pair, a lever pivoted on said bolt, a vehicle wheel on each lever, means for turning the wheels about vertical axes to steer the vehicle including a pair of rockarms and a rod connecting them, means for simultaneously tilting the vehicle wheels including a pivot at the middle of the axle, a rockarm journaled thereon, an extension at each side of the rockarm and links connecting the said extensions to the respective wheel-supporting levers, a block loosely pivoted on said rod, a bolt extending through said block and said rockarm, and means for simultaneously rocking the eccentrics to maintain the level of the axle comprising a rockarm loosely mounted on said pivot, links connecting said rockarm to a pair of said eccentrics, and links connecting the other pair of eccentrics to the first-named bolt, substantially as set forth.

In witness whereof, I have hereunto set my hand and seal at Lagrange, Georgia, this 23rd day of December, A. D. nineteen hundred and twenty-four.

ROBERT M. McMILLIN. [L. S.]